United States Patent [19]
Barjasteh et al.

[11] Patent Number: 5,244,010
[45] Date of Patent: Sep. 14, 1993

[54] SNAP AND SEAL COUPLER FOR REFRIGERATION SYSTEMS

[75] Inventors: Michael M. Barjasteh, Rockaway, N.J.; Jerry Umbro, Rhinebeck, N.Y.

[73] Assignee: Mastercool USA, Inc., Rockaway, N.J.

[21] Appl. No.: 968,837

[22] Filed: Oct. 30, 1992

[51] Int. Cl.⁵ ............................................. F16L 37/28
[52] U.S. Cl. ........................ 137/614.05; 137/614.03; 137/614
[58] Field of Search ...................... 137/614.03, 614.05, 137/614; 251/149.6

[56] References Cited

U.S. PATENT DOCUMENTS

| | | | |
|---|---|---|---|
| 2,765,181 | 10/1956 | Butterfield | 137/614.03 |
| 3,039,794 | 6/1962 | De Cenzo | 137/614.03 |
| 3,498,324 | 3/1970 | Breuning | 137/614.05 |
| 3,613,726 | 10/1971 | Torres | 137/614.03 |
| 4,200,121 | 4/1980 | Walter et al. | 137/614.05 |
| 4,627,598 | 12/1986 | Fremy | 251/149.6 |
| 4,667,925 | 5/1987 | Gaita | 251/149.1 |
| 4,756,558 | 7/1988 | Beamer | 285/921 |
| 4,863,201 | 9/1989 | Carotens | 251/149.6 |
| 4,913,467 | 4/1990 | Washizu | 285/319 |
| 4,924,909 | 5/1990 | Wilcox | 137/614.03 |
| 5,046,523 | 9/1991 | Horhota | 251/309 |
| 5,069,424 | 12/1991 | Demamy, Jr. et al. | 251/149.6 |

Primary Examiner—A. Michael Chambers
Attorney, Agent, or Firm—Mathews, Woodbridge & Collins

[57] ABSTRACT

A coupler for a refrigeration system easily snaps and locks in position over a service port and securely seals the coupler with respect thereto. A tubular outer body includes a first set of cavities which captures a first set of rotatable spherical balls A tubular inner body is located within the outer body and includes a second set of cavities for capturing second set of rotatable, spherical balls. The inner body includes a recess therein for selectively receiving the first set of balls from said outer body. The inner surface of the inner body defines an interior which includes a spring-loaded plunger. When the coupler is placed over a service port, the barrel of the service port enters the interior of the inner body and the plunger means contacts a spring-loaded ball valve causing it to open. At the same time, the first set of balls drops into a recess in the service port and the inner body moves forward with the service port against the biasing of an inner body spring. Further forward movement of the inner body causes the first set of balls in the outer body to drop into the recess in the outer surface of the inner body. A spring-loaded outer sleeve surrounding the outer body then moves forward over the first set of balls, thereby locking the inner body in position with respect to the outer body. Since the inner body is already sealed with respect to the service port the whole assembly is safety locked in position.

11 Claims, 5 Drawing Sheets

SNAP AND SEAL COUPLER FOR REFRIGERATION SYSTEMS

BACKGROUND OF THE INVENTION

1. Field of the Invention

The invention relates to a quick connect coupler to mate with either the high-side or low-side of the service port of a refrigeration system.

2. Description of Related Art

Refrigeration is a special aspect of heat transfer and involves the production and utilization of below-atmospheric temperatures. In a conventional refrigeration system, a refrigerant fluid is circulated through a closed system comprising a compressor, a condenser, expansion valves and an evaporator. Continuous recirculation of the cycle fluid or the refrigerant transports the heat energy from a low-temperature to a high-temperature level, thus providing the cooling power that can be used for applications such as air conditioning or refrigeration. During the transportation process, the refrigerant fluid changes its state from fluid to gas and then from gas back to fluid.

Freon is the most commonly used refrigerant fluid. According to the ANSI code B79.1-1968, refrigerant fluids are designated by numbers, such as, for example, Freon 12, R-12, or Jenetron 12. The chemical composition of Freon 12 or R-12 refrigerant fluid is dichlorodifluoromethane ($CCl_2F_2$) Unfortunately, for a variety of reasons, Freon gas can leak into the atmosphere. Leaking Freon gas is believed to be a cause of ozone depletion and, therefore, is considered to be an environmental hazard, which has been implicated in the so-called "green-house" effect. New regulations of the U.S. Environmental Protection Agency mandate the use of a refrigerant known as R-134A, or HFC-134, in which the dichloride is replaced by hydrogen in the dichlorodifluoromethane. Even though this new refrigerant is believed to minimize ozone depletion, it is still not permitted to be released into the atmosphere. Rather, it is required to be recycled in a closed system known as a recycling machine.

The refrigerant fluid is typically removed from a conventional heat transfer device by connecting the recycling machine to the high or low service port directly before or after the compressor stage of a refrigeration system. It is important that the connecting device or coupler seals the refrigeration service port quickly and efficiently in order to eliminate the leakage of refrigerant to the atmosphere. Conventional fittings, adapters and couplings have been used for connecting and disconnecting recycling machines to the tubular high or low-side service ports of air conditioning systems. In particular, conventional couplers and ports are commonly used for R-12 refrigerant systems. Recently the Society of Automotive Engineers (SAE), the Environmental Protection Agency (EPA) and automotive manufacturers have recommended that the high and low-side service ports of automotive air conditioners be provided with special quick connect/disconnect ports that do not require threads or screws. The purpose of this requirement is two-fold. First, it provides a quicker couple with better and safer sealing characteristics. Second, it prevents cross contamination of the two refrigerants (R-12 and R-134A). In order to comply with this requirement, manufacturers have begun to make couplings and fittings to comply with the requirements of the SAE, EPA and auto manufacturers. Unfortunately, many of these new couplers are bulky and large making them difficult to manipulate in small and crowded locations. Also, they take a significant amount of time to couple and uncouple and frequently require the screwing and unscrewing of a valve.

One major application of the new refrigerant, R-134A, is in automotive air conditioning systems as required by the EPA. Automotive manufacturers have begun to implement the use of the R-134A refrigerant and have provided a rather small space in the engine compartment for connecting the coupler to the high-side or low-side service port of the air conditioning unit. Conventional fittings and adapters that are available in the marketplace are difficult to use o all automotive applications since the maneuvering space within the engine compartment is so small.

In view of the foregoing, it is clear that there is a need for a coupling system that will quickly seal, snap in place and lock with respect to a service port of an automotive air conditioning system, either on the high-side or the low-side. It is also important that the coupler provide locking mechanism that prevents it from blowing off during installation or removal. That is to say, the invention should not permit a burst of air conditioning refrigerant to blow out as it is being connected or disconnected for environmental and safety reasons.

The conventional manner of connecting two mating tubes carrying fluid or gases usually involves the use of screws or clamps. Many fittings and connectors have been available on the market and used for specific applications. Unfortunately, they generally do not provide all of the necessary features in one unit, namely: quick connection; safe sealing; locking; safety; small size, and easy to use.

Automotive manufacturers such as Mercedes-Benz do provide adapters that can couple with the service port of an automotive air conditioner, however, with the Mercedes-Benz adaptor, it takes time to unscrew the valve and it is relatively heavy and bulky. Other manufacturers are also believed to have fabricated adapters that are relatively large and time consuming to manipulate.

Some prior art patents discuss devices that address one or two of the needs solved by the present invention but do not appear to address them all in a satisfactory way. Note, for example, the teachings in U.S. Pat. Nos. 4,667,925; 4,756,558; 4,913,467; 5,046,523 and 5,069,424.

It was in the context of the foregoing prior art that the present invention arose.

SUMMARY OF THE INVENTION

Briefly described, the invention comprises a quick seal, snap-on and lock coupling for use on the high-side or low-side of an automotive air conditioning unit or any refrigeration unit. The coupler includes a tubular outer body which has a first set of cavities therein for capturing a first set of rotatable, spherical balls. A tubular inner body is located within the tubular outer body and also includes a second set of cavities for capturing a second set of rotatable, spherical balls. The tubular inner body includes a recess on its outer surface for selectively receiving the first set of balls from said outer body. The inner surface of the inner tubular body defines an interior which houses a spring-loaded plunger. The interior of the inner body also communicates with the recycling machine that captures the refrigerant fluid removed from the refrigeration system.

A typical snap-connect service port includes a body and a barrel which mates with a coupler. The barrel is hollow and communicates with a spring-loaded ball valve which in turn communicates with either the high or low-side of the compressor stage of the refrigeration system. A circular recess downstream of the barrel is adapted to engage a locking mechanism as part of the snap-on requirements of the SAE, EPA and automotive manufacturers.

When the coupler is placed over the barrel of the service port, the barrel enters the interior of the inner body. As it does, the exterior of the barrel makes contact with an O-ring embedded in the inner surface of the inner body and forms a sealing connection therewith. Further penetration of the service port into the inner body causes the second set of balls in the inner body to drop into the snap-on recess of the service port. Further travel of the service port with respect to the coupler, causes the interior plunger to contact the ball valve and urges the ball away from its seat, thereby opening up communication between the high or low-side of the compressor stage of the air conditioning unit to the interior of the coupler and to the recycling machine. Continued forward movement of the service port with respect to the coupler, causes the inner body to move with the service port against the bias of a spring until such time as the first set of balls in the outer body drop into the recess in the outer wall of the inner body. By this point in time, the inner body is snapped onto and engaged with the service port because the second set of balls are in the snap-on recess in the service port. The first set of balls are held in place because they now face the inner wall of the outer body. Similarly, the inner body is now locked in position with respect to the outer body because the first set of balls now occupies the recess and the outer surface of the inner body. Because the first set of balls have dropped down into the recess, a spring-loaded outer sleeve which surrounds the outer body moves forward over the first set of balls and keeps them in the first recess. An stop means in the form of a ring on the outer surface of the outer body prevents the sleeve from travelling to far forward. In this position, the service port is quickly and easily and safely snapped into the coupling and locked thereon by means of the outer sleeve and its cooperation with the inner and outer bodies.

The coupler is quickly disconnected by merely pulling the sleeve back, away from the service port. This permits the natural spring action of the inner body spring working against the inner body to push the inner body away from the outer body as the first set of balls are now pushed away from the recess in the inner body by the natural force of the spring. This, in turn, releases the second set of balls from the inner wall of the outer body causing them to move away from the snap-on recess in the service port. The coupler can now be safely and easily removed merely by pulling the two elements further apart. It will be appreciated from the foregoing that the invention provides a relatively quick and safe seal, is relatively small, easy to use, and safe.

The invention can be further better understood by referring to the following drawings.

DETAILED DESCRIPTION OF THE INVENTION

During the course of this description, like numbers will be used to illustrate like elements according to the different Figures which illustrate the invention.

Figure 1:
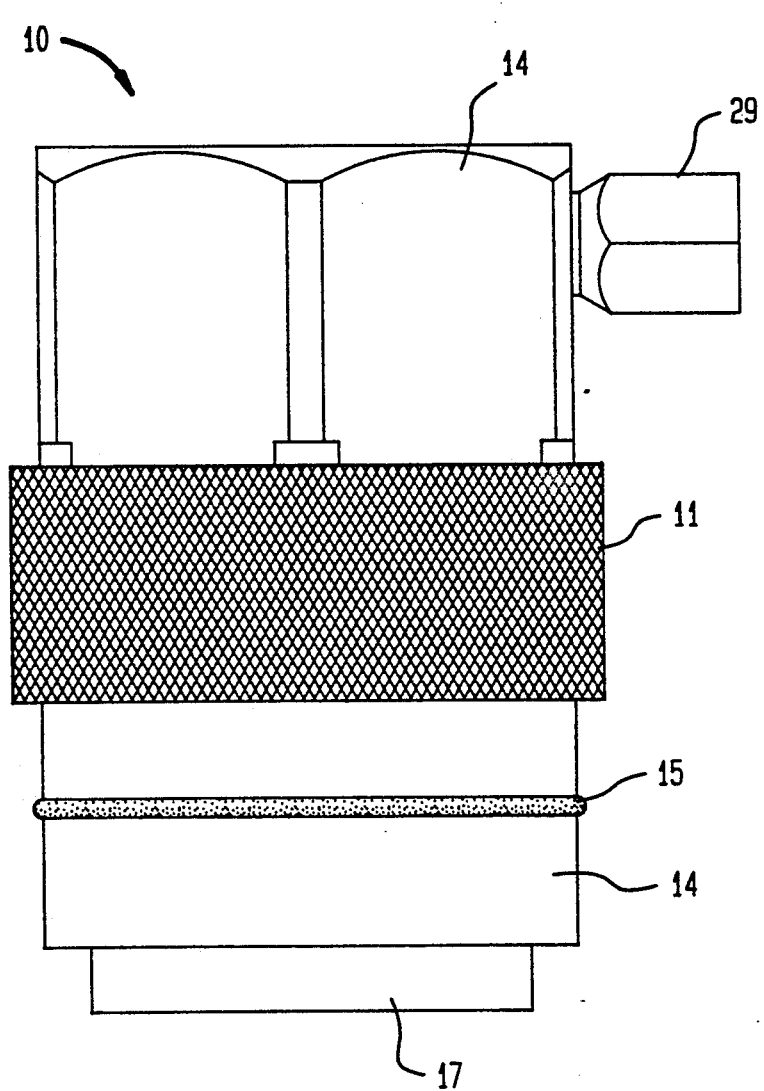
FIG. 1 is side elevational view of the preferred embodiment of the coupler invention.
Figure 2:
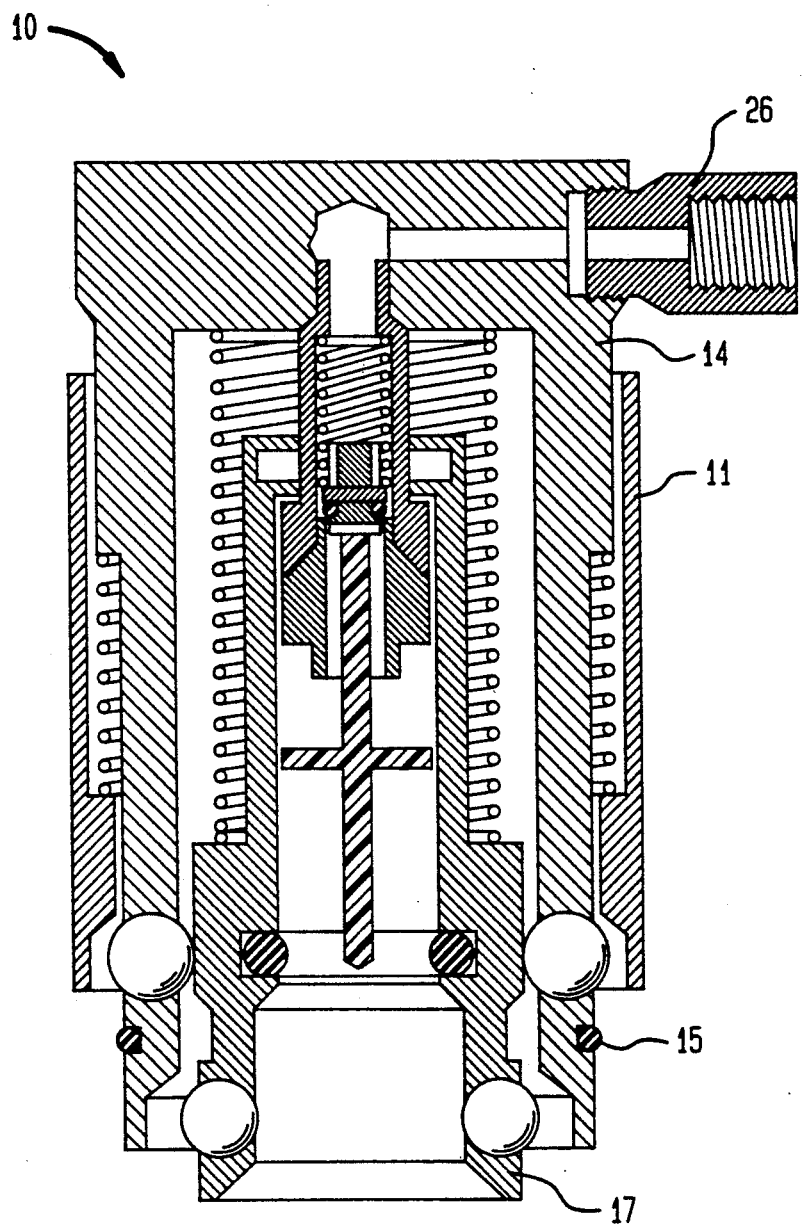
FIG. 2 is a general cross-sectional view of the preferred embodiment of the invention illustrated in FIG. 1.
Figure 3:
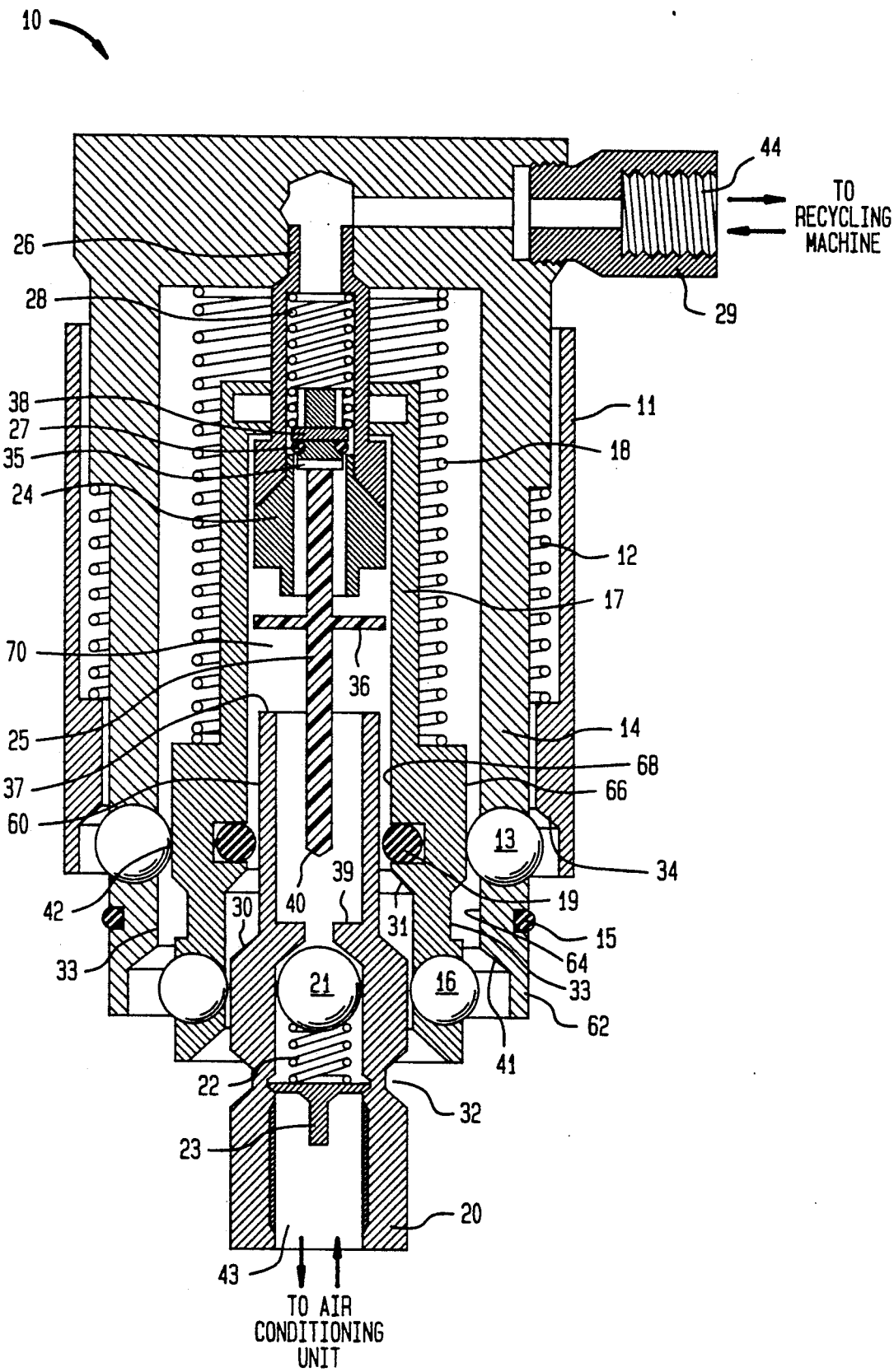
FIG. 3 is a detailed cross-sectional view of the preferred embodiment of the invention illustrated in FIGS. 1 and 2 showing the invention in its pre-locked mode.

The preferred embodiment of the invention is illustrated in a side elevational view in FIG. 1 and in a corresponding cross-sectional, side elevational view in FIG. 2. Coupler 10 is adapted to mate with the high or low pressure side service port 50 of a refrigeration system such as illustrated in cross-sectional detail in FIG. 4. Further details can be understood by referring to FIG. 3 which illustrates a service port 50 mating with a coupler 10 according to the preferred embodiment of the invention.

The snap and seal coupler 10 according to the preferred embodiment includes a tubular outer sleeve 11 that is biased by a spring 12 away from a tubular outer body 14. A cavity in outer body 14 accommodates three balls or beads 13. The thickness of outer body 14 between its outer 62 and inner 64 surfaces is smaller than the diameter of the three balls 13 so that portions of the balls 13 normally extend beyond the inner 64 and outer 62 surfaces of the outer body 14 when the coupler 10 is in the uncoupled mode. Because the three balls 13 extend beyond the outer surface 62 of the outer body 14 in the uncoupled mode, they interfere with the forward movement of the sleeve 11 under the influence of spring 12, thereby stopping sleeve 11 from further forward progress. Outer balls 13 can move laterally into cavity 33 of inner body 17 when the inner body 17 is moved axially upward. If the inner body 17 is moved upwards against the influence of inner spring 18, the surface 34 of sleeve 11 becomes free, that is to say it no longer contacts one of the three balls 13, and spring 12 then pushes sleeve 11 downward until the sleeve 11 is stopped by stop means or ring 15. Stop ring 15 sits in a recess in the outer surface 62 of outer body 14. Inner body 17 also includes a large diameter cavity for capturing a second set of three rotatable, spherical inner balls 16. Inner body 17 has an outer surface 66 and an inner surface 64 and includes an internal groove on its inner surface 68 where an O-ring seal 19 is located. The inner surface 68 of the inner body 17 defines an interior 70 for receiving the barrel 60 of service port 50. Inner body 17 is normally biased axially downwards at all times by an inner spring 18 and is stopped at point 35 by contacting the plunger outer body 26 which is screwed into the base of outer body 14.

The plunger assembly comprises a plunger inner body 24, plunger needle 25, plunger outer body 26, plunger seal 27 and plunger spring 28. The plunger needle 25 and the plunger seal 27 are normally biased downwardly under the influence of spring 28 so that the seal 27 is firmly pressed against the inclined surface of the plunger inner body 24. The plunger inner body 24 is screwed into and connected with the plunger outer body 26 which itself is screwed into and connected to the outer body 14. The plunger needle 25 preferably includes a circular disk 36 and an incline surface 40 at its tip so that the disk 36 and the tip 40 contact the barrel 60 of the high-side or low-side service port body 50 at the same time in order to force the needle 25 axially upward to open the ball valve 21

The hose connection port 29 is screwed into and connected to the outer body 14. The connection port 29 is, in turn, attached to a conventional refrigerant fluid recycling machine by threaded inlet 44.

Figure 4:
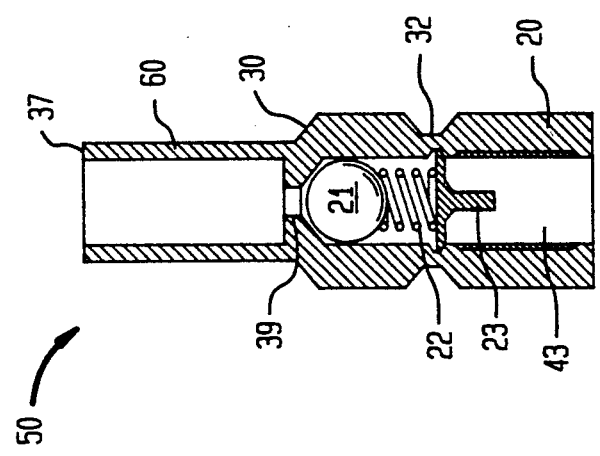
FIG. 4 is a cross-sectional view of the low side of a typical snap-on service port of an automobile refrigeration system.

The high-side or low-side service port 50 seen in FIG. 4 comprises an outer body 20, a ball port valve 21, a service port spring 22 which normally biases the ball valve 11 into the closed position and a service port stopper 23. A leading edge 37 is located at the end of the barrel 60 connected to the outer body 20. A snap-in or snap-on groove 32 is located around the periphery of outer body 20 and is adapted to receive the inner balls 16 when the inner body 17 is pushed upward axially under the influence of the service port 50 entering the interior 70 of the inner body 17.

Figure 5A:
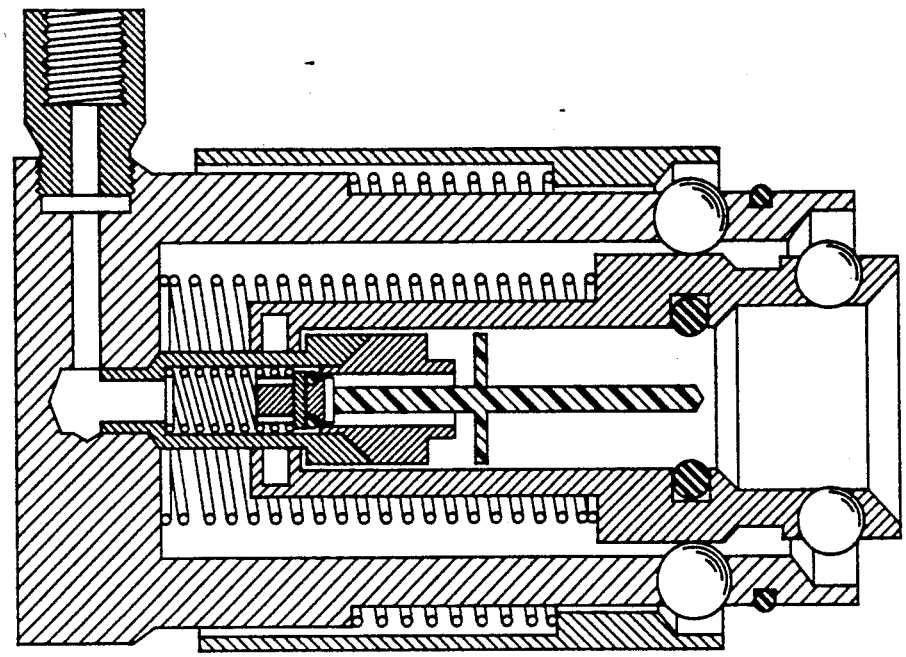
FIG. 5A is a cross-sectional view of the preferred embodiment of the invention before it is mated with a snap-on service port of a refrigeration system.
Figure 5C:
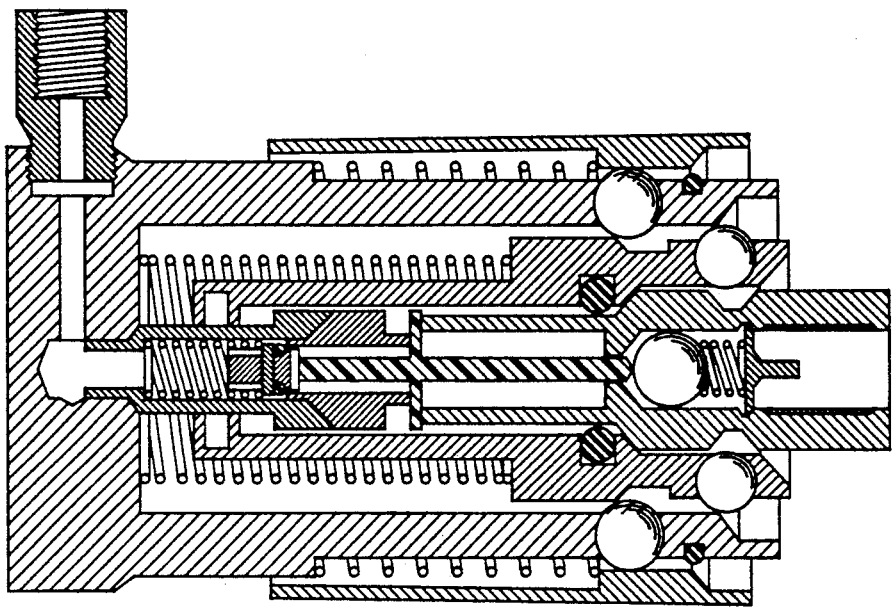
FIG. 5C is a cross-sectional view of the preferred embodiment of the invention with a service port completely sealed, snapped on and locked into position with respect to the preferred embodiment of the coupler so that the refrigerant in the air conditioning system communicates through the coupler to a recycling machine.
Figure 5B:
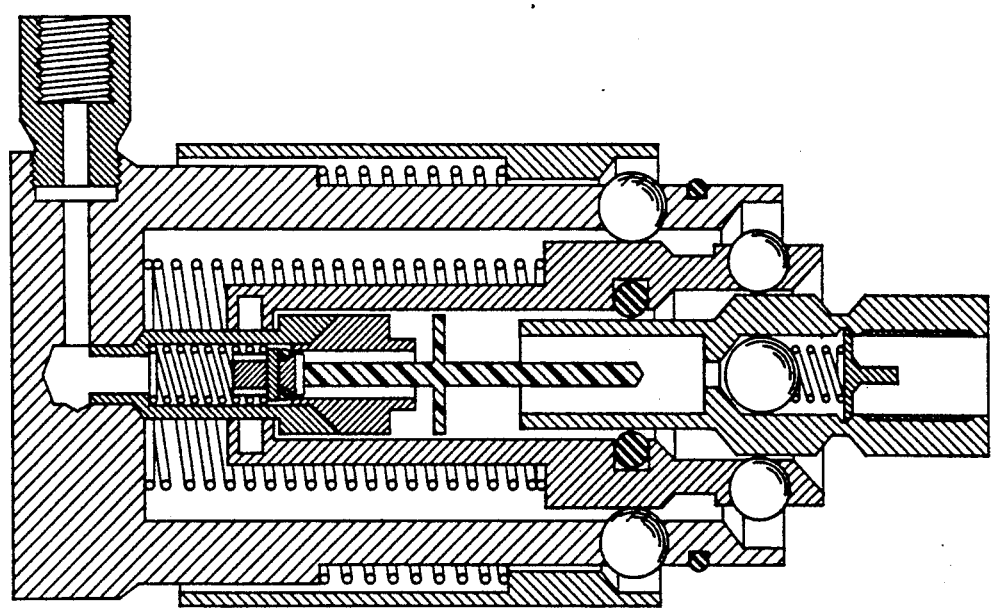
FIG. 5B is a cross-sectional view of the preferred embodiment of the invention as it begins to mate with the snap-on service port of a refrigeration system.

The sealing, snapping and locking function is accomplished by the following steps. The coupler is initially in the state shown in FIG. 5A. The first step shown in FIG. 5B in the coupler's 10 connection to the service port 50 starts with sealing. When the coupler assembly 10 is placed on the high-side or low-side of the service port body 20, the O-ring seal 19 will contact the outer surface of the service port body barrel 60 and seal it with respect to the outside atmosphere. The sealing of the O-ring 19 is sufficient to separate and isolate the internal volume of the assembly 10 from the outside ambient air.

The process of snapping and locking the coupler 10 with respect to the service port 50 starts by pushing the service port barrel 60 and body 20 into the assembly 10 so that the inclined surface 30 of the service port body 20 contacts the matching surface 31 of the inner body 17. Continued movement of the service port body 20 into the interior 70 of the inner body 17 causes the inner body 17 to move axially upward against the bias of inner body spring 18. When this happens, the inner body balls 16 will be pushed laterally by surface 41 of outer body 14 into the recessed groove 32 of the service port body 20. This action locks the connection of the service port body 20 with respect to the inner body 17 of the assembly 10. At the same time, the outer balls 13 that were pushed against the surface 42 or 66 of the inner body 17 will be forced to move laterally into the recess or groove 33 of the inner body 17 under the force of surface 34 of the sleeve 11. Sleeve 11 then moves downwardly under the bias of outer spring 12. Sleeve 11 is stopped by stop means or ring 15 located on the exterior surface 62 of the outer body 14. The foregoing action seals, snaps and locks the coupler assembly 10 in position on the service port 50.

While the sealing, snapping and locking actions are taking place, the disk surface 36 and the tip surface 40 of the plunger needle 25 contacts the surfaces 37 and 39 of the service port body 20, respectively, thus pushing the plunging needle 25 axially upward and, at the same time, pushing the ball port valve 21 axially downward. The upward movement of the needle 25 and the downward movement of the port ball valve 21 connects the hose connection port 29 and the interior volume 44 of the recycling machine with the low or high-side 43 of the interior of the refrigeration system. Then the refrigerant R-134A is free to flow from region 43 to region 44 or visa versa.

Once the refrigerant coolant coupling operation is completed, the coupler 10 can be removed simply by pulling sleeve 11 axially upward in the direction of the hose connector port 29. This permits the outer balls 13 to move laterally outward, thus permitting the inner spring 18 to push the inner body 17 axially away from the outer body 14. The inner beads 16 along with springs 28 and 22 will eject the service port body 20 out into an unlocked position. At the same time, the seal O-ring 19 is still in contact with the barrel 60 of the service port body 20, thereby sealing the inner volume of the assembly from the outside. Lastly, the user, by exerting a minimal amount of force, can withdraw the coupler 10 from the barrel 60 of the service port body 20 without any significant leakage.

The foregoing invention has a number of useful advantages over the prior art. First, it seals the connection between the service port and the coupler before the apparatus is in the snap-on and lock mode, thereby making it safe and environmentally sound. Second, it locks the connection through snapping action while the coupling operation is in progress. Third, it is very light, easy to use and relatively small so that it can be used in confined spaces such as in an automobile engine compartment. Fourth, it can be disconnected quickly with an absolute minimum of refrigerant leakage.

While the invention has been described with reference to the preferred embodiment thereof, it will be appreciated by those of ordinary skill in the art that modifications can be made to the structure and function of the elements that comprise the invention, without departing from the spirit and scope of the invention as a whole.

What is claimed is:

1. A coupling apparatus for use with the service port of a refrigeration fluid-containing system wherein said service port includes a body having an exterior groove therein, a barrel, a ball valve and a spring for biasing said ball valve into a normally closed position inside of said body, said apparatus comprising:

an outer body having an inner and an outer surface and including at least a first cavity therein;

a first set of spherical, rotatable means captured in said first cavity;

an inner body located within said outer body and including an outer surface and an inner surface which define a service port receiving interior, said outer surface including a first recess therein for selectively receiving said first spherical, rotatable means, said inner body also including a second cavity therein;

a groove located on the inner surface of said inner body;

an O-ring means located in said groove for contacting the barrel of said service port when said service port moves into the interior of said inner body and for providing a substantially leakproof seal with respect thereto;

a second set of spherical, rotatable means captured in said second cavity;

an inner body spring means for biasing said inner body away from said outer body;

a plunger means for opening said ball valve located within said service port, said plunger means including a plunger body attached to said outer body, a plunger needle including a first and at least partially received in said plunger body and a second end for selectively contacting and opening said ball valve, a disk attached to said plunger needle and located between said first and second ends, and a plunger needle spring housed within said plunger body for biasing said plunger needle away from said plunger body;

an outer sleeve at least partially surrounding said outer body; and an outer sleeve spring means for biasing said outer sleeve away from said outer body, wherein relative movement of said service port into the interior of said inner body causes said O-ring means to form a seal with respect to the barrel of said service port, and further causes said second set of spherical, rotatable means to snap into said exterior groove in said service port and further causes said first set of spherical means to snap into said first recess in said outer surface of said inner body, and further causes said barrel of said service to contact said disk on said plunger needle as said second end of said plunger needle contacts and opens said ball valve and further wherein said outer sleeve locks said first set of spherical, rotatable means in said first recess in said inner body when said service port is substantially fully received in said interior of said inner body.

2. The apparatus of claim 1 wherein said plunger body comprises:
an inner plunger body which is threadably attached to said outer body; and
an inner plunger body which is threadably received in said outer plunger body.

3. The apparatus of claim 2 further comprising:
a plunger needle seal attached to said first end of said plunger needle,
wherein force applied by the barrel of said service port against said plunger disk causes said first end of said plunger needle to move against the bias of said plunger needle spring, thereby communicating the interior of said service port with the interior of said coupling apparatus.

4. The apparatus of claim 3 wherein said plunger needle seal comprises an O-ring that normally contacts said inner plunger body when said service port is removed from said interior of said inner body.

5. The apparatus of claim 4 further comprising:
stop means located on the outer surface of said outer body for limiting the travel of said outer sleeve when said outer sleeve travels forward away from said outer body under the biasing influence of said outer spring.

6. The apparatus of claim 5 further comprising:
a groove in the outer surface of said outer body.

7. The apparatus of claim 6 wherein said stop means comprises a ring located in said groove in the outer surface of said outer body.

8. The apparatus of claim 7 wherein said first and second set of spherical, rotatable means comprises a plurality of 9. The apparatus of claim 8 wherein said plurality of balls comprises three balls.

10. The apparatus of claim 7 wherein said first and second set of spherical, rotatable means comprises beads.

11. The apparatus of claim 10 wherein said refrigeration system is an automobile air conditioning system.

* * * * *